(12) United States Patent
Ahrens et al.

(10) Patent No.: US 6,550,019 B1
(45) Date of Patent: Apr. 15, 2003

(54) METHOD AND APPARATUS FOR PROBLEM IDENTIFICATION DURING INITIAL PROGRAM LOAD IN A MULTIPROCESSOR SYSTEM

(75) Inventors: George Henry Ahrens, Pflugerville, TX (US); George John Dawkins, Austin, TX (US); Michael Youhour Lim, Leander, TX (US); Timothy Lee Toohey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,068

(22) Filed: Nov. 4, 1999

(51) Int. Cl.[7] .................................................. H02H 3/05
(52) U.S. Cl. .............................................. 714/10; 713/1
(58) Field of Search .................. 714/10, 13, 36, 714/51; 713/1, 2; 712/227

(56) References Cited

U.S. PATENT DOCUMENTS

| | | | | |
|---|---|---|---|---|
| 5,349,664 A | * | 9/1994 | Ikeda et al. | 710/37 |
| 5,418,955 A | * | 5/1995 | Ikeda et al. | 713/1 |
| 5,469,575 A | * | 11/1995 | Madduri | 707/3 |
| 5,815,651 A | * | 9/1998 | Litt | 709/107 |
| 5,867,702 A | * | 2/1999 | Lee | 713/1 |
| 5,892,895 A | * | 4/1999 | Basavaiah et al. | 714/10 |
| 5,919,266 A | * | 7/1999 | Sud et al. | 714/13 |
| 6,000,040 A | * | 12/1999 | Culley et al. | 714/31 |
| 6,178,445 B1 | * | 1/2001 | Dawkins et al. | 709/208 |
| 6,216,226 B1 | * | 4/2001 | Agha et al. | 713/1 |

* cited by examiner

Primary Examiner—Robert Beausoliel
Assistant Examiner—Yolanda L. Wilson
(74) Attorney, Agent, or Firm—Duke W. Yee; Mark E. McBurney; Lisa B. Yociss

(57) ABSTRACT

A method and apparatus for detecting an error condition during initialization of a multiprocessor data processing system is provided. A master processor identification indicator is initialized to an initial value by a service processor in the data processing system. The master processor identification indicator may be a location in nonvolatile RAM to protect data integrity. One of the plurality of processors in the multiprocessor system is selected to be the master processor by being released by the service processor and winning the "race condition" to fetch the first instruction from memory for program execution. This processor then sets the master processor identification indicator to a unique processor identification value. The initial value may be a spoof number indicating whether the master processor has yet written its unique processor identification value. At some later point in time, the service processor detects a freeze or hang condition in the data processing system. The service processor reads the value of the master processor identification indicator and reports the value of the master processor identification indicator to indicate which processor among the plurality of processors in the data processing system was selected as the master processor prior to the detection of the hang condition.

21 Claims, 3 Drawing Sheets

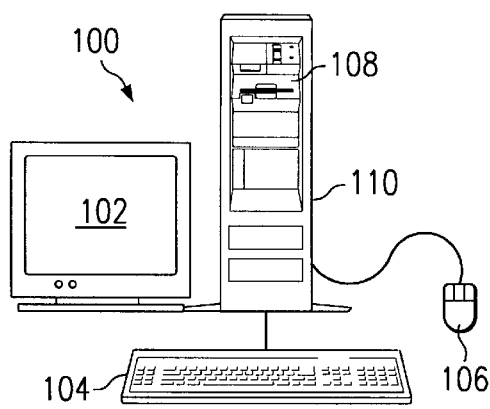
FIG. 1
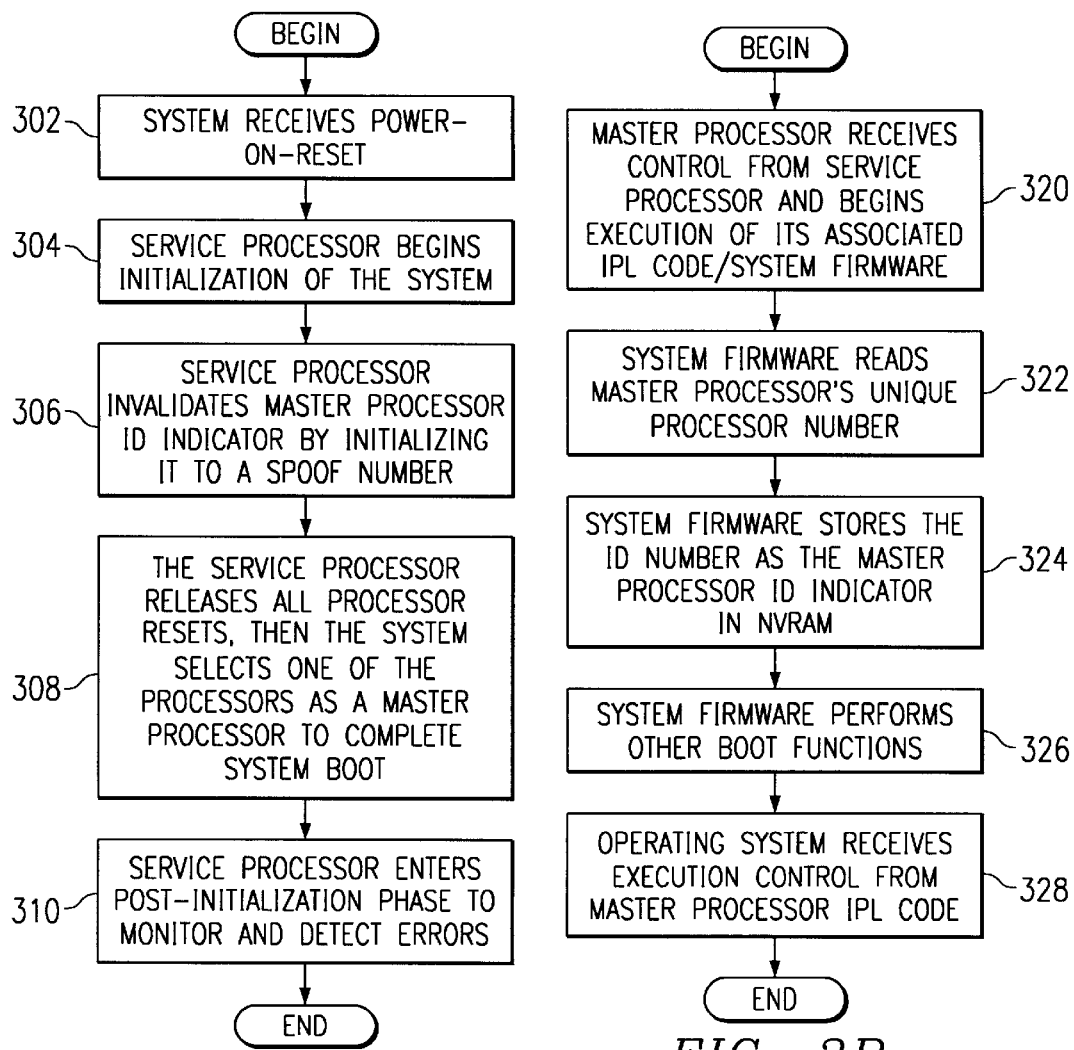
FIG. 3A
FIG. 3B

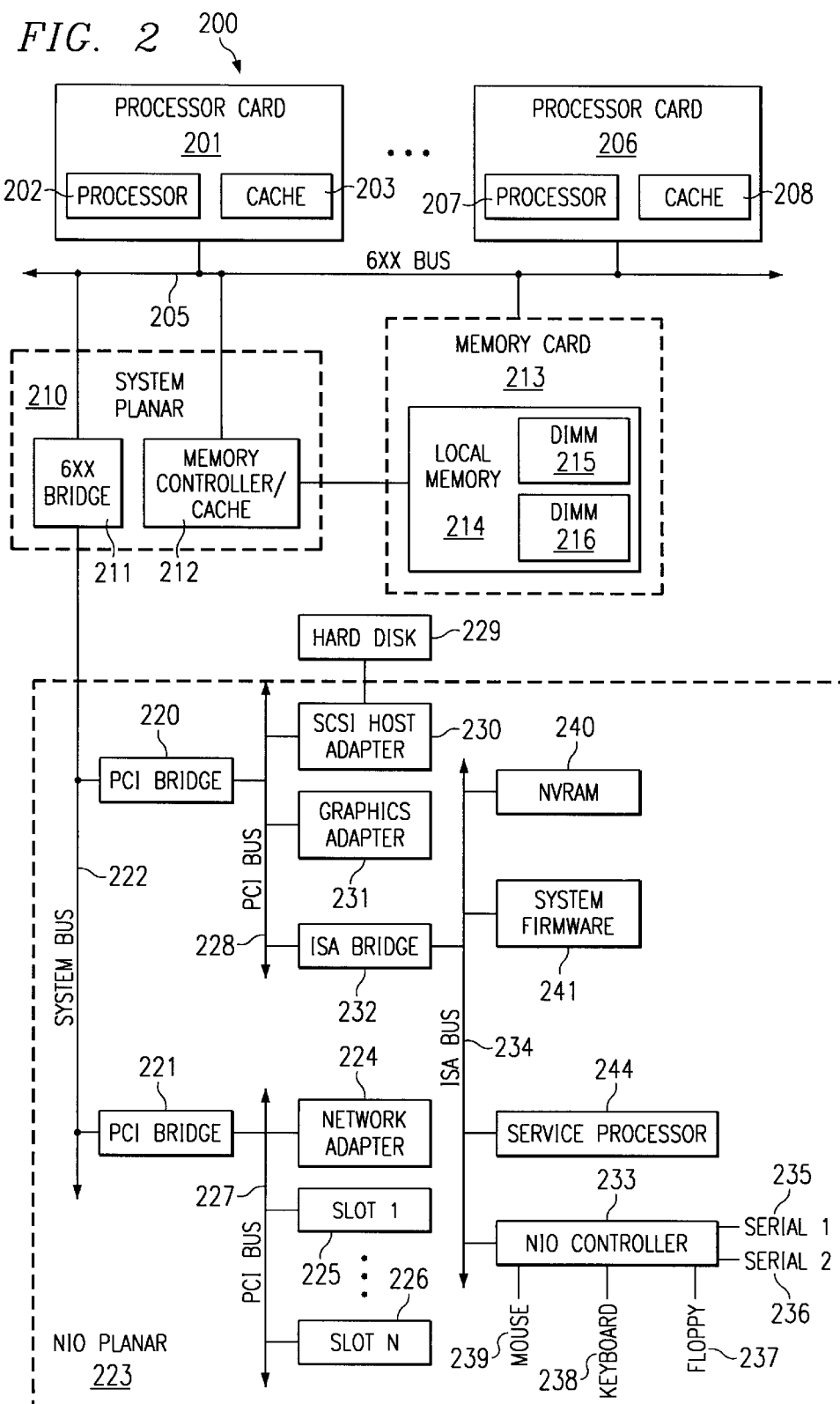

US 6,550,019 B1

METHOD AND APPARATUS FOR PROBLEM IDENTIFICATION DURING INITIAL PROGRAM LOAD IN A MULTIPROCESSOR SYSTEM

The present invention is related to U.S. Pat. No. 6,178,445 B1 entitled "SYSTEM AND METHOD FOR DETERMINING WHICH PROCESSOR IS THE MASTER PROCESSOR IN A SYMMETRIC MULTI-PROCESSOR ENVIRONMENT", U.S. application Ser. No. 09/052,456, filed on Mar. 31, 1998, and issued on Jan. 23, 2001, herein incorporated by reference.

BACKGROUND OF THE INVENTION

1. Technical Field

The present invention relates to an improved data processing system and, in particular, to a method and system for data processing system reliability, and more specifically, for location of faulty components.

2. Description of Related Art

As computers become more sophisticated, diagnostic and repair processes have become more complicated and require more time to complete. Diagnostic procedures generally specify several possible solutions to an error or problem in order to guide a service engineer to a determination and subsequent resolution of the problem. The service engineer may perform several corrective steps for each diagnostic procedure while attempting to resolve the problem. The service engineer may "chase" errors through lengthy diagnostic procedures in an attempt to locate one or more components that may be causing errors within the computer.

For example, a diagnostic procedure may indicate an installed component or field replaceable unit (FRU) that is a likely candidate for the error, and the installed FRU may be replaced with a new FRU. The reported problem may be considered resolved at that point. If, after further testing of the previously installed FRU, the FRU is later determined to be reliable, the original problem has not actually been resolved and may remain unresolved until the next error is reported.

Diagnosing errors during initial program load (IPL) is especially difficult because the operating system, which may contain sophisticated error logging functions, has not yet been loaded at that stage of system initialization, and the IPL code is purposefully devoid of most diagnostic functions in order to keep the IPL code efficient. If the system suffers from a freeze or hang condition in which the system simply stops responding during IPL, the only solution to diagnosing the error may be directing the service engineer to replace one FRU at a time and then rebooting the system to see if the system successfully completes the IPL.

The potential for misdiagnosis is compounded if the system has multiple, identical FRUs and the diagnostic procedure indicates that any one of the multiple FRUs could be a likely candidate for the error. For example, in a multiprocessor system, any one of the processor FRUs with associated IPL code may cause an error. In this situation, the service engineer may attempt, through trial and error, to resolve a problem by replacing each FRU in turn and then retesting the system. In the worst case, the time required for diagnosing the problem is multiplied by the number of identical FRUs. Isolating defective FRUs through trial and error is time consuming and costly. In addition to paying for unnecessary components, a business must also pay for the recurring labor costs of the service engineer and lost productivity of the user of the error-prone system.

Therefore, it would be advantageous to provide a method and apparatus for efficiently diagnosing problems during IPL within multiprocessor data processing systems.

SUMMARY OF THE INVENTION

A method and apparatus for detecting an error condition during initialization of a multiprocessor data processing system is provided. A master processor identification indicator is initialized to an initial value by a service processor in the data processing system. The master processor identification indicator may be a location in nonvolatile RAM to protect data integrity. One of the plurality of processors in the multiprocessor system is selected to be the master processor by being released by the service processor and winning the "race condition" to fetch the first instruction from memory for program execution. This processor then sets the master processor identification indicator to a unique processor identification value. The initial value may be a spoof number indicating whether the master processor has yet written its unique processor identification value. At some later point in time, the service processor detects a freeze or hang condition in the data processing system. The service processor reads the value of the master processor identification indicator and reports the value of the master processor identification indicator to indicate which processor among the plurality of processors in the data processing system was selected as the master processor prior to the detection of the hang condition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation depicting a data processing system in which the present invention may be implemented;

FIG. 2 is an example block diagram illustrating internal components of a server-type data processing system that may implement the present invention;

FIG. 3 is a flowchart depicting a process for initializing a data processing system using a service processor in accordance with the preferred embodiment of the present invention;

FIG. 3A is a flowchart depicting a process for initializing a data processing system using a service processor in accordance with the preferred embodiment of the present invention;

FIG. 3B is a flowchart depicting the processing performed by a master processor during an initialization phase of a multiprocessor system in accordance with a preferred embodiment of the present invention.

DETAILED DESCRIPTION OF THE PREFERRED EMBODIMENT

Figure 3C:
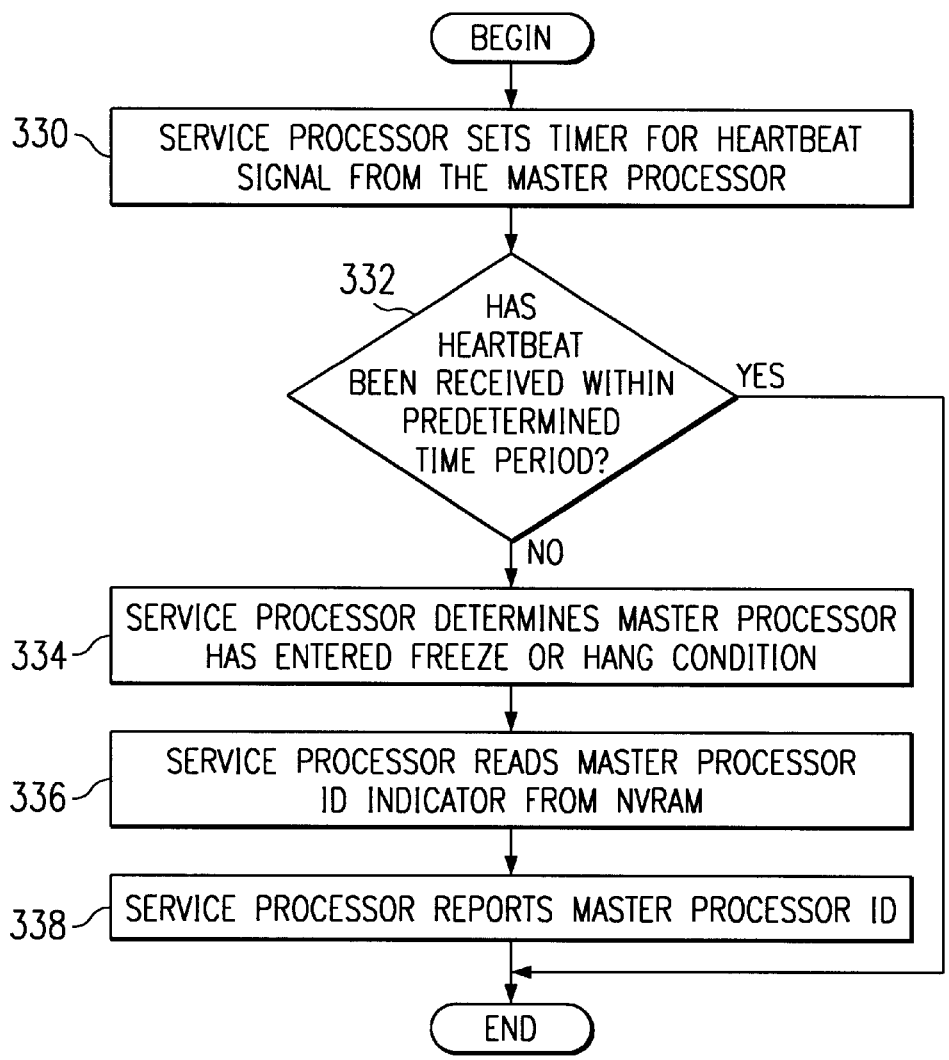
FIG. 3C is a flowchart depicting a process in which the service processor detects a freeze or hang condition during the IPL execution phase in accordance with a preferred embodiment of the present invention.

With reference now to FIG. 1, a pictorial representation depicts a data processing system in which the present invention may be implemented. A computer 100 is depicted, which includes a system unit 110, a video display terminal 102, a keyboard 104, storage devices 108, which may include floppy drives and other types of permanent and removable storage media, and mouse 106. Additional input devices may be included with computer 100. Computer 100 can be implemented using any suitable computer, for example, an IBM RISC/System 6000 system, a product of International Business Machines Corporation in Armonk, N.Y., running the Advanced Interactive Executive (AIX) operating system, also a product of IBM. Although the depicted representation shows a server-type computer, other embodiments of the present invention may be implemented in other types of data processing systems, such as workstations, network computers, Web-based television set-top boxes, Internet appliances, etc. Computer 100 also preferably includes a graphical user interface that may be implemented by means of system software residing in computer readable media in operation within computer 100.

FIG. 1 is intended as an example and not as an architectural limitation for the present invention.

With reference now to FIG. 2, a block diagram depicts a typical organization of internal components in a data processing system. Data processing system 200 employs a variety of bus structures and protocols. Although the depicted example employs a PCI bus, an ISA bus, and a 6XX bus, other bus architectures and protocols may be used.

Processor card 201 contains processor 202 and L2 cache 203 that are connected to 6XX bus 205. System 200 may contain a plurality of processor cards. Processor card 206 contains processor 207 and L2 cache 208.

6XX bus 205 supports system planar 210 that contains 6XX bridge 211 and memory controller 212 that supports memory card 213. Memory card 213 contains local memory 214 consisting of a plurality of dual in-line memory modules (DIMMs) 215 and 216.

6XX bridge 211 connects to PCI bridges 220 and 221 via system bus 222. PCI briges 220 and 221 are contained on native I/O (NIO) planar 223 which supports a variety of I/O components and interfaces. PCI bridge 221 provides connections for external data streams through network adapter 224 and a number of card slots 225–226 via PCI bus 227. PCI bridge 220 connects a variety of I/O devices via PCI bus 228. Hard disk 229 may be connected to SCSI host adapter 230, which is connected to PCI bus 228. Graphics adapter 231 may also be connected to PCI bus 228 as depicted, either directly or indirectly.

ISA bridge 232 connects to PCI bridge 220 via PCI bus 228. ISA bridge 232 provides interconnection capabilities through NIO controller 233 via ISA bus 234, such as serial connections 235 and 236. Floppy drive connection 237 provides removable storage. Keyboard connection 238 and mouse connection 239 allow data processing system 200 to accept input data from a user. Non-volatile RAM (NVRAM) 240 provides non-volatile memory for preserving certain types of data from system disruptions or system failures, such as power supply problems. System firmware 241 is also connected to ISA bus 234 and controls the initial BIOS. Service processor 244 is connected to ISA bus 234 and provides functionality for system diagnostics or system servicing.

Service processor 244 detects errors and passes information to the operating system. The source of the errors may or may not be known to a reasonable certainty at the time that the error is detected. The operating system may merely log the errors against the system planar.

For example, boot-time errors, severe intermittent problems, and adverse environmental computing conditions, such as conditional bandwidth bottlenecks, may be logged by the service processor into an error report buffer. These errors are eventually output and reported in some form, either to a hard drive or one of many types of backup systems. Each detected error may result in the generation of an error record comprising a timestamp at the time of detection, detailed data pertinent to the failing function, including physical location code, symptom bits, etc. Further analysis may be done at a later time if the error logs are stored in an error log file or error log buffer containing the data that some problem determination procedures may require for analysis.

The manner of logging and processing a detected error may depend on the type of error and when the error occurs, e.g., whether the error occurs during system initialization procedures. If an error is detected during system initialization, all devices, components, or services within the data processing system may not have been initialized. For example, if an error is detected during system initialization, the service firmware may present certain errors to a system operator by writing error codes or error messages to an LCD display or system display monitor physically connected to the data processing system without being able to log error-derived data to the system log file. In other cases, the action of logging the data may start problem determination procedures in the operating system automatically. This may be accomplished by a daemon within the operating system that invokes pre-registered procedures based on the personality traits of the error logged.

Those of ordinary skill in the art will appreciate that the hardware in FIG. 2 may vary depending on the system implementation. For example, the system may have more processors, and other peripheral devices may be used in addition to or in place of the hardware depicted in FIG. 2. The depicted examples are not meant to imply architectural limitations with respect to the present invention.

With reference now to FIG. 3A, a flowchart depicts a process for initializing a data processing system using a service processor in accordance with the preferred embodiment of the present invention. The process begins with a power-on-reset (step 302) after which the service processor begins initialization of the system (step 304). As an early step in the initialization procedure, the service processor invalidates a special location in NVRAM that identifies a processor ID of a currently-executing processor (step 306). A portion of memory, such as a word, may be reserved in NVRAM whose address or location is known to each of the processors in the multiprocessor system. The service processor may write a spoof number to this location, termed a "master processor ID indicator," to indicate that no non-service processor has begun executing during the IPL phase of the system initialization. The spoof number does not correspond to a processor ID for any of the processors in the multiprocessor system.

After executing its IPL code, the service processor releases all processor resets, which places the multiple processors into a "race condition" to determine which processor asserts itself as a master processor. One of the processors then becomes a master processor to complete system boot (step 308). Once the IPL code associated with the service processor has completed, the service processor may enter a normal execution phase in which the service processor monitors and detects errors within the data processing system, including errors related to the system boot performed by the master processor (step 310). In this manner, the service processor provides an indication that may be used at a later time to identify the master processor ID if it fails to complete its IPL code execution phase.

With reference now to FIG. 3B, a flowchart depicts the processing performed by a master processor during an initialization phase of a multiprocessor system in accordance with a preferred embodiment of the present invention. The process begins when the IPL code or system firmware associated with the master processor receives control from the service processor (step 320). Early in the execution of its IPL code, the system firmware reads the master processor's unique processor number or identification number from the master processor (step 322). The identification number may be hard-coded or otherwise write-protected during manufacture or installation in some manner or may be initialized through system configuration to provide a unique identifier amongst each of the processors in the multiprocessor system. The system firmware then stores the master processor identification number in the same location in NVRAM at which the service processor previously wrote a spoof number (step 324), i.e. it stores its identification number as the master processor ID indicator. The system firmware performs other boot functions in an attempt to load the operating system for the multiprocessor system (step 326). After the boot functions are completed via the IPL code associated with the master processor, the operating system receives control and initializes the other processors and performs other boot functions for the data processing system (step 328). In this manner, a processor within the multiprocessor system provides an indication of its processor number such that the service processor may later identify which of the multiple processors was chosen as the master processor to complete the initialization of the system.

The multiple processors may be brought online independently of each other. For example, they may be randomly released, or they may be released at staggered intervals. In this manner, the processors may enter a "race condition" in which one of the processors eventually asserts itself as the master processor as the result of a master processor selection process. A specific implementation of a master processor selection process may be found in U.S. Pat. No. 6,178,445 B1, entitled: "SYSTEM AND METHOD FOR DETERMINING WHICH PROCESSOR IS THE MASTER PROCESSOR IN A SYMMETRIC MULTI-PROCESSOR ENVIRONMENT", U.S. application Ser. No. 09/052,456, Attorney Docket Number AT9-98-078, filed on Mar. 31, 1998, and issued on Jan. 23, 2001.

With reference now to FIG. 3C, a flowchart depicts a process in which the service processor detects a freeze or hang condition during the IPL execution phase in accordance with a preferred embodiment of the present invention. The process begins with the setting of a timer or other time monitoring mechanism in the service processor for the receipt of a heartbeat from the master processor to the service processor (step 330). Although the service processor may not be able to identify the master processor at this point, the service processor is always "known" to all of the other processors in the system, and the master processor is able to send the heartbeat signal to the service processor. A determination is made as to whether the master processor returns a heartbeat signal or message within a predetermined time period (step 332). If so, the process branches so that the service processor may continue other monitoring or detection functions, including continuation of monitoring the initialization of the master processor, and the process is complete with respect to this particular loop for monitoring the master processor.

If a heartbeat signal or message is not received by the service processor from the master processor within the predetermined time period, the service processor concludes that the master processor has entered a freeze or hang condition (step 334). The time period during which the master processor is performing other boot functions, such as loading the operating system for the multiprocessor system, may be relatively long and complex. For a variety of reasons, the IPL phase may fail, causing the system to freeze or hang.

The service processor then reads the master processor ID stored in NVRAM, i.e. the master processor ID indicator, by the master processor during its IPL code execution (step 336). The service processor then reports the master processor ID to an error log or error display (step 338). The manner in which the master processor ID is reported for diagnostic purposes may vary depending upon system implementation.

The advantages provided by the present invention should be apparent in view of the detailed description of the invention provided above. The determination of the location of problematic hardware using prior art methods may often fail because the hardware component that is causing errors is often not suspected until one or more other components have been tested or analyzed using problem determination procedures. For example, an intermittent error caused by a faulty component in a hierarchically arranged set of components frequently implicates one of its child components. When problem determination procedures are performed on the component that seems to have caused an error, no problem will be found in the component, and the location of the problem may escape detection until more diagnostics are performed at some later time in response to other errors.

The present invention provides a method and system for efficiently diagnosing problems during IPL within multiprocessor data processing systems. The use of nonvolatile RAM ensures that the master processor ID is saved from various other error conditions that may cause data in volatile RAM to be lost. By saving the processor identification number of the processor that has been chosen as the master processor, the service processor can report which processor FRU has failed to complete execution of its IPL code and placed the system in the freeze or hang condition during IPL. The reported master processor ID number thereby identifies the processor FRU that needs to be replaced in order to resolve the system freeze or hang position.

If there is no valid processor identification number stored in NVRAM, then the FRU that contains the IPL code might contain the IPL problem, such as corrupt IPL code, and might need to be replaced. In other words, the master processor selection process may fail for a variety of reasons before a processor had a chance to write its processor ID number, providing an indication of the source of the IPL problem.

Rather than performing a potentially random search for faulty components, or an exhaustive test of all components, a hardware component is analyzed as a likely candidate. In this manner, the problem determination procedure is automated, quicker, and more accurate, thus reducing time to diagnose the problem and preventing the possibility of incorrect parts being replaced as suspected faulty components.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include ROM chips or writable-type media such a floppy disc, a hard disk drive, a RAM, and CD-ROMs as well as transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for detecting an error condition during initialization of a data processing system comprising a plurality of processors, the method comprising the computer-implemented steps of:

initializing a master processor identification indicator to an initial value by a service processor in the data processing system;

initiating execution on a processor selected as a master processor at random from the plurality of processors, each one of the plurality of processors being associated with a different unique identifier that identifies each one of the plurality of processors;

determining a unique identifier that identifies the processor; and storing, by the master processor, the unique identifier that identifies the processor as the master processor identification indicator.

2. The method of claim 1 further comprising:

detecting a hang condition in the data processing system by the service processor;

reading a value of the master processor identification indicator by the service processor; and reporting the value of the master processor identification indicator to indicate which processor among the plurality of processors in the data processing system is operating as the master processor during the detection of the hang condition.

3. The method of claim 2 wherein the step of detecting a hang condition further comprising:

determining that the master processor has failed to return a heartbeat signal in a predetermined period of time.

4. The method of claim 2 wherein the detection of the hang condition occurs during initial program load.

5. The method of claim 1 wherein the master processor identification indicator is a location in nonvolatile RAM.

6. The method of claim 1 wherein the initial value is a spoof number indicating whether the master processor has set the master processor identification indicator to a unique processor identification value.

7. A data processing system for detecting an error condition during initialization of the data processing system comprising a plurality of processors, the data processing system comprising:

initializing means for initializing a master processor identification indicator to an initial value by a service processor in the data processing system;

initiating means for initiating execution on a processor selected as a master processor at random from the plurality of processors, each one of the plurality of processors being associated with a different unique identifier that identifies each one of the plurality of processors;

determining means for determining a unique identifier that identifies the processor; and storing means for storing, by the master processor, the unique identifier that identifies the processor as the master processor identification indicator.

8. The data processing system of claim 7 further comprising:

detecting means for detecting a hang condition in the data processing system by the service processor;

reading means for reading a value of the master processor identification indicator by the service processor; and reporting means for reporting the value of the master processor identification indicator to indicate which processor among the plurality of processors in the data processing system is operating as the master processor during the detection of the hang condition.

9. The data processing system of claim 8 wherein the means for detecting a hang condition further comprise:

determining means for determining that the master processor has failed to return a heartbeat signal in a predetermined period of time.

10. The data processing system of claim 8 wherein the detection of the hang condition occurs during initial program load.

11. The data processing system of claim 7 wherein the master processor identification indicator is a location in nonvolatile RAM.

12. The data processing system of claim 7 wherein the initial value is a spoof number indicating whether the master processor has set the master processor identification indicator to a unique processor identification value.

13. A computer program product in a computer-readable medium for use in a data processing system for detecting an error condition during initialization of the data processing system comprising a plurality of processors, the computer program product comprising:

first instructions for initializing a master processor identification indicator to an initial value by a service processor in the data processing system;

second instructions for initiating execution on a processor selected as a master processor at random from the plurality of processors, each one of the plurality of processors being associated with a different unique identifier that identifies each one of the plurality of processors;

third instructions for determining a unique identifier that identifies the processor; and fourth instructions for storing, by the master processor, the unique identifier that identifies the processor as the master processor identification indicator.

14. The computer program product of claim 13 further comprising:

instructions for detecting a hang condition in the data processing system by the service processor;

instructions for reading a value of the master processor identification indicator by the service processor; and instructions for reporting the value of the master processor identification indicator to indicate which processor among the plurality of processors in the data processing system is operating as the master processor during the detection of the hang condition.

15. The computer program product of claim 14 wherein the instructions for detecting a hang condition further comprise:

instructions for determining that the master processor has failed to return a heartbeat signal in a predetermined period of time.

16. The computer program product of claim 14 wherein the detection of the hang condition occurs during initial program load.

17. The computer program product of claim 13 wherein the master processor identification indicator is a location in nonvolatile RAM.

18. The computer program product of claim 13 wherein the initial value is a spoof number indicating whether the master processor has set the master processor identification indicator to a unique processor identification value.

19. A method for detecting an error condition during initialization of a data processing system comprising a plurality of processors, the method comprising the computer-implemented steps of:

initializing a master processor identification indicator to an initial value by a service processor in the data processing system;

initiating execution on a processor selected as a master processor at random from the plurality of processors;

setting the master processor identification indicator to a unique processor identification value by the master processor;

detecting a hang condition in the data processing system by the service processor;

reading a value of the master processor identification indicator by the service processor; and reporting the value of the master processor identification indicator to indicate which processor among the plurality of processors in the data processing system is operating as the master processor during the detection of the hang condition.

20. A data processing system for detecting an error condition during initialization of the data processing system comprising a plurality of processors, the data processing system comprising:

initializing means for initializing a master processor identification indicator to an initial value by a service processor in the data processing system;

initiating means for initiating execution on a processor selected as a master processor at random from the plurality of processors;

setting means for setting the master processor identification indicator to a unique processor identification value by the master processor;

detecting means for detecting a hang condition in the data processing system by the service processor;

reading means for reading a value of the master processor identification indicator by the service processor; and reporting means for reporting the value of the master processor identification indicator to indicate which processor among the plurality of processors in the data processing system is operating as the master processor during the detection of the hang condition.

21. A computer program product in a computer-readable medium for use in a data processing system for detecting an error condition during initialization of the data processing system comprising a plurality of processors, the computer program product comprising:

instructions for initializing a master processor identification indicator to an initial value by a service processor in the data processing system;

instructions for initiating execution on a processor selected as a master processor at random from the plurality of processors;

instructions for setting the master processor identification indicator to a unique processor identification value by the master processor;

instructions for detecting a hang condition in the data processing system by the service processor;

instructions for reading a value of the master processor identification indicator by the service processor; and instructions for reporting the value of the master processor identification indicator to indicate which processor among the plurality of processors in the data processing system is operating as the master processor during the detection of the hang condition.

* * * * *

UNITED STATES PATENT AND TRADEMARK OFFICE
CERTIFICATE OF CORRECTION

PATENT NO.    : 6,550,019 B1
DATED         : April 15, 2003
INVENTOR(S)   : Ahrens et al.

It is certified that error appears in the above-identified patent and that said Letters Patent is hereby corrected as shown below:

Column 2,
Please delete lines 45-48.

Signed and Sealed this

Seventh Day of October, 2003

JAMES E. ROGAN
*Director of the United States Patent and Trademark Office*